(12) United States Patent
Yamamoto et al.

(10) Patent No.: US 12,005,814 B2
(45) Date of Patent: Jun. 11, 2024

(54) POWER SUPPLY DEVICE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yasuyuki Yamamoto, Mie (JP); Hidetoshi Ishida, Mie (JP); Satoshi Yamamoto, Mie (JP); Kenichi Sagara, Miyagi (JP); Keizo Watanabe, Miyagi (JP); Yutaka Kikuchi, Miyagi (JP); Shu Sasaki, Miyagi (JP); Fumihiro Sato, Miyagi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 378 days.

(21) Appl. No.: 17/435,798

(22) PCT Filed: Feb. 17, 2020

(86) PCT No.: PCT/JP2020/005974
§ 371 (c)(1),
(2) Date: Sep. 2, 2021

(87) PCT Pub. No.: WO2020/179419
PCT Pub. Date: Sep. 10, 2020

(65) Prior Publication Data
US 2022/0144137 A1    May 12, 2022

(30) Foreign Application Priority Data
Mar. 5, 2019 (JP) .................. 2019-039644

(51) Int. Cl.
*B60N 2/02* (2006.01)
*B60N 2/06* (2006.01)
(Continued)

(52) U.S. Cl.
CPC ............. *B60N 2/0224* (2013.01); *B60N 2/06* (2013.01); *B60N 2/14* (2013.01); *H02J 50/10* (2016.02)

(58) Field of Classification Search
CPC ......... H01F 38/14; H02J 50/10; H02J 50/005; H02J 2310/40; B60N 2/06; B60N 2/0224; B60N 2/14; B60N 2/0264
See application file for complete search history.

(56) References Cited

U.S. PATENT DOCUMENTS

2019/0260238 A1* 8/2019 Cho ................... H02J 50/12

FOREIGN PATENT DOCUMENTS

| DE | 102018213335 A1 * | 2/2020 | ............ B60N 2/067 |
| JP | 2013-162609 A | 8/2013 | |
| WO | 2019/082444 A1 | 5/2019 | |

OTHER PUBLICATIONS

International Search Report dated Apr. 7, 2020 for WO 2020/179419 A1 (4 pages).

* cited by examiner

*Primary Examiner* — Quan Tra
(74) *Attorney, Agent, or Firm* — Venjuris, P.C.

(57) ABSTRACT

The power supply device 10 including: a power transmission unit 40 that is provided on the floor part F and that extends along a slide direction in which the seat S slides; and a power receiving unit 70 that is provided to the seat S and that receives power from the power transmission unit 40 in a contactless fashion. The power transmission unit 40 is provided so that the length dimension thereof in the slide direction is longer than the length dimension thereof in a (Continued)

direction that is orthogonal to the slide direction, and a part of the power receiving unit 70 that receives power from the power transmission unit 40 is positioned close to the power transmission unit 40 within an installation area of the power transmission unit 40 while the seat S slides and rotates.

8 Claims, 16 Drawing Sheets

(51) Int. Cl.
*B60N 2/14* (2006.01)
*H02J 50/10* (2016.01)

POWER SUPPLY DEVICE

CROSS REFERENCE TO RELATED APPLICATIONS

This application is a national phase of PCT application No. PCT/JP2020/005974, filed on 17 Feb. 2020, which claims priority from Japanese patent application No. 2019-039644, filed on 5 Mar. 2019, all of which are incorporated herein by reference.

TECHNICAL FIELD

The technique disclosed in the present specification relates to a power supply device.

BACKGROUND

For example, as a power supply mechanism for supplying power in a contactless fashion to a slidable seat mounted in a vehicle, the power supply mechanism disclosed in Japanese Patent Laid-open Publication No. 2013-162609 (Patent Document 1 below) is known. This power supply mechanism includes a power supplying unit that is provided standing upright on a floor part of a vehicle body, and a power receiving unit that is provided in a leg part of the slidable seat. The power receiving unit faces the power supplying unit in the front-rear direction, and power is supplied to the power receiving unit in a contactless fashion by the power supplying unit.

PRIOR ART DOCUMENT

Patent Document

Patent Document 1: JP 2013-162609 A

SUMMARY OF THE INVENTION

Problems to be Solved

Incidentally, due to the automation of vehicle driving, etc., a technique of providing seats with increased functionality is being looked into. Furthermore, as seats mounted in a vehicle, seats that have a function of rotating in addition to sliding relative to a vehicle body are being looked into.

However, if a seat is provided with a rotation function in the above-described power supply mechanism, the power receiving unit will move to positions where power cannot be supplied to the power receiving unit from the power supplying unit due to rotation of the seat. Accordingly, power cannot be supplied from the power supplying unit to the power receiving unit.

In the present specification, a technique for supplying power in a contactless fashion to a seat that can slide and rotate will be disclosed.

Means to Solve the Problem

The present disclosure provides a power supply device that supplies power to a seat that can slide and rotate relative to a floor part of a vehicle, the power supply device including: a power transmission unit that is provided on the floor part and that extends along a slide direction in which the seat slides; and a power receiving unit that is provided on the bottom part of the seat and that receives power from the power transmission unit in a contactless fashion, wherein the power transmission unit is provided so that the length dimension thereof in the slide direction is longer than the length dimension thereof in a direction that is orthogonal to the slide direction, and a part of the power receiving unit that receives power from the power transmission unit is positioned close to the power transmission unit within an installation area of the power transmission unit while the seat slides and rotates.

Effect of the Invention

According to the technique disclosed in the present specification, power can be supplied in a contactless fashion to a seat that can slide and rotate.

DETAILED DESCRIPTION TO EXECUTE THE INVENTION

Outline of Embodiments

Figure 1:
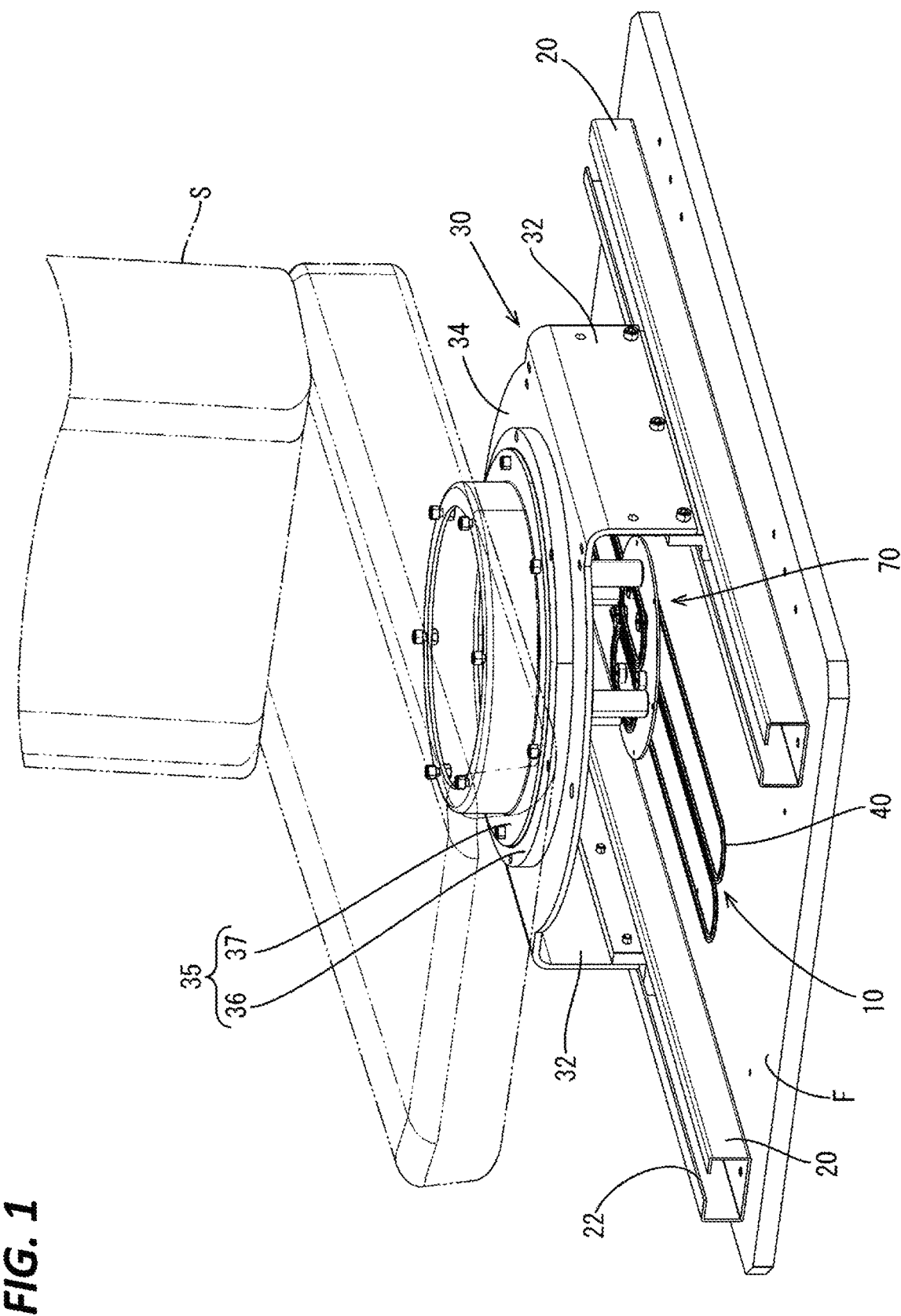
FIG. 1 is a perspective view illustrating a state in which a power supply device pertaining to embodiment 1 is attached to a seat turntable.

First, embodiments disclosed in the present specification will be outlined.

(1) A power supply device that supplies power to a seat that can slide and rotate relative to a floor part of a vehicle, the power supply device including: a power transmission unit that is provided on the floor part and that extends along a slide direction in which the seat slides; and a power receiving unit that is provided on the bottom part of the seat and that receives power from the power transmission unit in a contactless fashion, wherein the power transmission unit is provided so that the length dimension thereof in the slide direction is longer than the length dimension thereof in a direction that is orthogonal to the slide direction, and a part of the power receiving unit that receives power from the power transmission unit is positioned close to the power transmission unit within an installation area of the power transmission unit while the seat slides and rotates.

(2) A configuration may be adopted in which the power transmission unit includes a power transmission coil that is formed by winding a winding wire, and the power receiving unit includes a power receiving coil which is formed by winding a winding wire and in which inductive power is generated by magnetic fluxes of the power transmission coil.

According to the power supply device having the above-described configuration, the part of the power receiving unit that receives power from the power transmission unit is positioned close to the power transmission unit within the installation area of the power transmission unit even when the seat slides and rotates. Thus, according to the above-described configuration, power can be supplied in a contactless fashion according to the so-called electromagnetic induction method to a seat that can slide and rotate.

(3) A configuration may be adopted in which the power transmission coil includes: a first annular power transmission coil that includes a first extended power transmission portion that extends in the slide direction; and a second annular power transmission coil which includes a second extended power transmission portion that extends in the slide direction along the first extended power transmission portion, and in which the direction of a current in the second extended power transmission portion is the same as the direction of a current in the first extended power transmission portion, and the power receiving coil includes: a first annular power receiving coil that includes a first extended power receiving portion that extends in the slide direction along the first extended power transmission portion when the seat is facing the direction in which the vehicle advances; and a second annular power receiving coil which includes a second extended power receiving portion that extends in the slide direction along the first extended power receiving portion and the second extended power transmission portion when the seat is facing the direction in which the vehicle advances, and in which the direction of a current in the second extended power receiving portion is the same as the direction of a current in the first extended power receiving portion.

According to the above-described configuration, a magnetic flux generated by the first annular power transmission coil and a magnetic flux generated by the second annular power transmission coil act in opposite directions, and magnetic fluxes having an annular shape are generated about the part where the first and second extended power transmission portions are positioned along one another. Thus, magnetic fluxes of the part of the power transmission unit where the first and second extended power transmission portions are positioned along one another can be strengthened. Accordingly, the above-described configuration improves the efficiency with which power is supplied in a contactless fashion to the seat compared to a case in which power is supplied with a power transmission coil and a power receiving coil configured to have circular shapes, for example.

Incidentally, in the electromagnetic induction method, magnetic fluxes that do not link with a power receiving coil of a power receiving unit, etc., included in magnetic fluxes of a power transmission coil of a power transmission unit, usually become leakage fluxes. Thus, in a case in which power is to be supplied to a power receiving unit provided to a seat using magnetic fluxes of a power transmission unit provided on a floor part, there is a concern that magnetic fluxes of the power transmission unit will leak to the outside.

However, according to the above-described configuration, the magnetic flux generated by the first annular power transmission coil and the magnetic flux generated by the second annular power transmission coil act in opposite directions, and magnetic fluxes outside the part where the first and second extended power transmission portions are positioned along one another are mutually weakened. Thus, leakage fluxes from the power transmission coil can be suppressed. Thus, the influence of leakage fluxes in the power transmission unit on the outside can be suppressed.

(4) A configuration may be adopted in which the first annular power transmission coil and the second annular power transmission coil are connected in series.

According to the above-described configuration, the circuit configuration of the power transmission unit can be simplified. Furthermore, the currents in the first and second annular power transmission coils can be equalized. That is, the magnetic flux generated by the first annular power transmission coil and the magnetic flux generated by the second annular power transmission coil can be easily set to the same intensity. Thus, the first and second extended power transmission portions can efficiently strengthen one another's magnetic fluxes.

(5) A configuration may be adopted in which the power receiving unit includes at least one auxiliary power receiving coil which is formed by winding a winding wire and in which inductive power is generated by the magnetic fluxes of the power transmission coil, and the auxiliary power receiving coil includes: a first annular auxiliary coil that includes a first extended auxiliary portion that extends in a direction intersecting with the first extended power receiving portion; and a second annular auxiliary coil which includes a second extended auxiliary portion that extends along the first extended auxiliary portion, and in which a magnetic flux acting in a direction differing from the direction of a magnetic flux of the first annular auxiliary coil is generated.

Incidentally, there is a concern that, when the seat rotates, the power supply efficiency in the power receiving unit will decrease due to the angular displacement, in the direction of rotation, between the first and second extended power transmission portions in the power transmission coil and the first and second extended power receiving portions in the power receiving coil.

However, according to the above-described configuration, the power receiving unit includes the auxiliary power receiving coil, which includes the first extended auxiliary portion extending in a direction intersecting with the first extended power receiving portion and the second extended auxiliary portion extending in a direction intersecting with the second extended power receiving portion. Thus, even if the power supply efficiency of the power receiving coil decreases due to the seat rotating, the power in the power receiving coil, the power supply efficiency of which has decreased, can be supplemented with the power generated in the auxiliary power receiving coil. Thus, a decrease in efficiency of contactless power supply can be suppressed.

(6) A configuration may be adopted in which the first extended auxiliary portion extends in a direction that is orthogonal to the first extended power receiving portion, and the second extended auxiliary portion extends in a direction that is orthogonal to the second extended power receiving portion.

When the seat rotates 90 degrees (π/2 radians), the power supplied from the power transmission coil to the power receiving coil decreases due to the first and second extended power transmission portions in the power transmission coil and the first and second extended power receiving portions in the power receiving coil being positioned orthogonally to one another.

However, according to the above-described configuration, the direction in which the first extended auxiliary portion extends and the direction in which the first extended power transmission portion extends match, and the direction in which the second extended auxiliary portion extends and the direction in which the second extended power transmission portion extends match when the seat is rotated 90 degrees. That is, power can be supplied to the seat in a contactless fashion through the combination of the power transmission coil and the auxiliary power receiving coil, and a decrease in efficiency of power supply to the seat can be suppressed.

(7) A configuration may be adopted in which the power receiving unit includes a plurality of auxiliary power receiving coils, and, in each of the auxiliary power receiving coils, the first extended auxiliary portion in the first annular auxiliary coil is positioned so as to be displaced in the direction in which the seat rotates from the first extended power receiving portion and the first extended auxiliary portions of the other first annular auxiliary coils.

According to the above-described configuration, if the seat rotates, power can be supplied in a contactless fashion to the seat by supplementing the power in the power receiving coil, the power supply efficiency of which has decreased, with the power generated by one of the plurality of auxiliary power receiving coils. Thus, a decrease in efficiency of power supply to the seat can be suppressed.

Details of Embodiments

The power supply device disclosed in the present specification is not limited to the examples described in the following, and is intended to include all modifications that are indicated by the claims and are within the meaning and scope of equivalents of the claims.

Embodiment 1

Embodiment 1 of the technique disclosed in the present specification will be described with reference to FIGS. 1 to 10.

Figure 2:
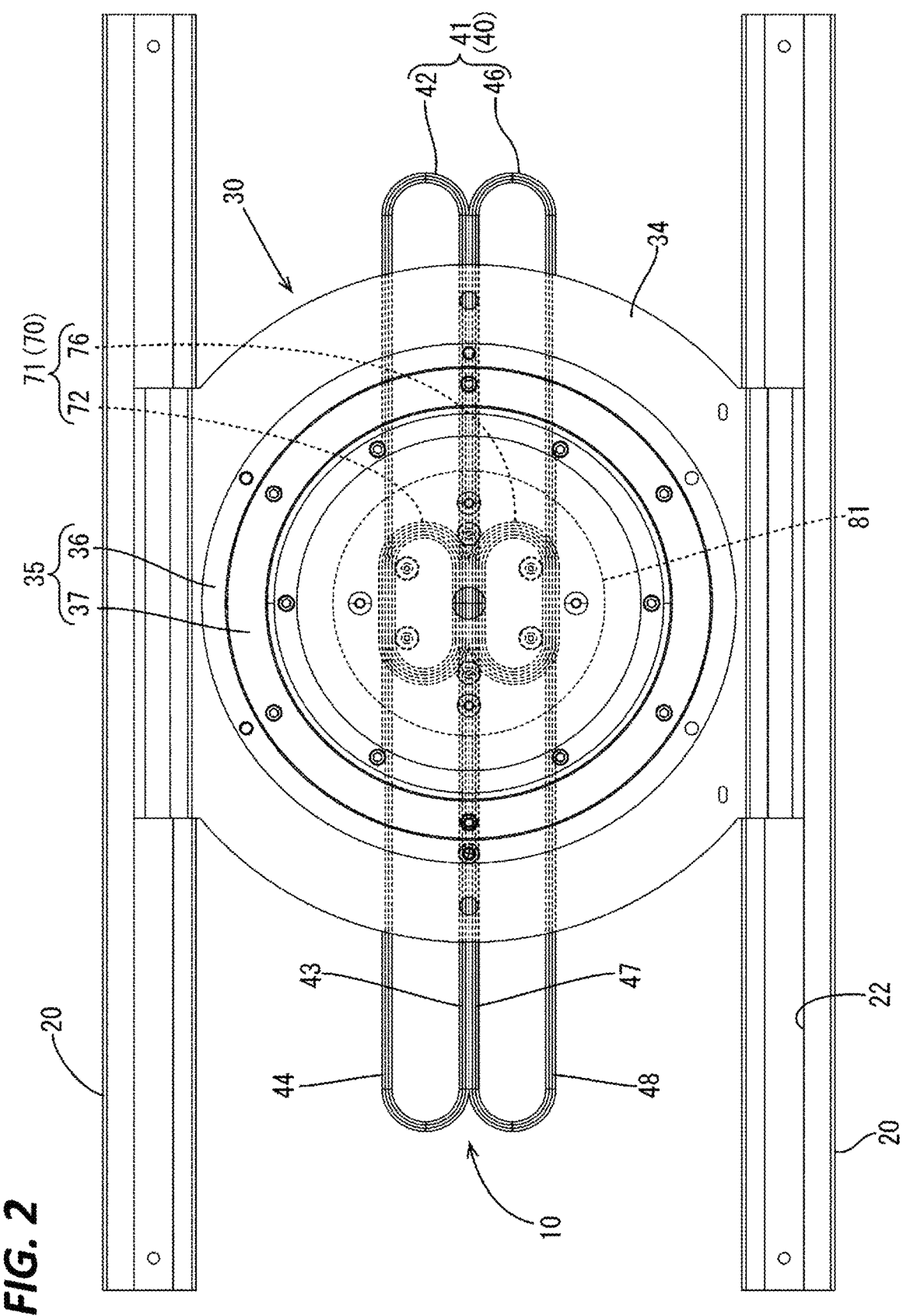
FIG. 2 is a plan view illustrating a state in which the power supply device is attached to the turntable.
Figure 3:
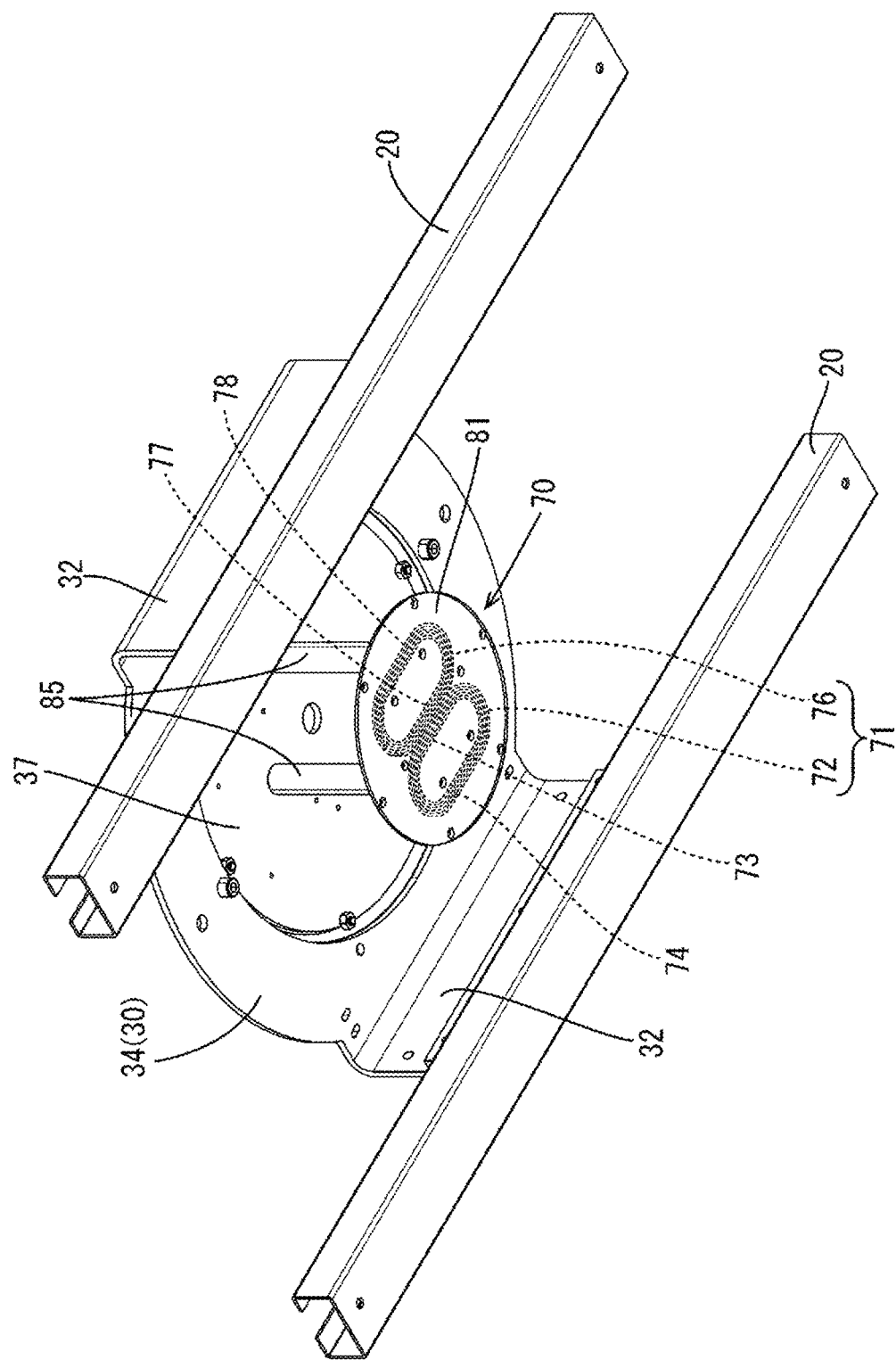
FIG. 3 is a perspective view illustrating a state in which a power receiving unit attached to the turntable is seen from diagonally below.

As illustrated in FIG. 1, the present embodiment describes, as an example, a power supply device 10 that supplies power to a seat S mounted in a vehicle. In FIGS. 2 and 3, illustration of the seat S is omitted for convenience so that the power supply device 10 can be easily seen.

As illustrated in FIG. 1, the seat S is configured so as to be slidable in a front-rear direction relative to a pair of rails 20 that are fixed to a floor part F of a vehicle compartment by means of bolt fastening or the like.

The seat S is attached to the pair of rails 20 in a state in which the seat S can slide in the front-rear direction. For example, the seat S is provided with various electric components, such as an electric reclining device, a seat heater, a display such as a touch panel, an air conditioner, a sensor that detects whether or not a vehicle occupant is sitting on the seat S, and a sensor that detects whether or not a seatbelt is being worn. Power is supplied to the various electric components from the power supply device 10 attached to the bottom part of the seat S.

As illustrated in FIGS. 1 to 4, the pair of rails 20 are arranged in parallel with a space therebetween in a left-right direction. The rails 20 are each formed in the shape of a rectangular tube extending in a straight line in the front-rear direction. A desired metal, such as stainless steel, aluminum, or an aluminum alloy, can be selected as necessary and as appropriate as the metal forming the rails 20.

In the rails 20, a support member 30 that slides back and forth is attached to extend between the pair of rails 20, as illustrated in FIG. 1.

The support member 30 includes a pair of leg portions 32 that are inserted in a top-bottom direction through insert grooves 22 provided in the top plates of the rails 20, and a support portion main body 34 that connects the pair of leg portions 32.

The leg portions 32 are formed in the shape of plates that are elongated in the front-rear direction. The bottom end portions of the leg portions 32 are configured so as to be movable in the front-rear direction inside the rails 20. Accordingly, as the leg portions 32 move inside the rails in the front-rear direction, the support member 30 and consequently the seat S attached to the support member 30 move in the front-rear direction along the rails 20.

The support portion main body 34 continuously extends from the top end portions of the leg portions 32 over the entire length of the leg portions 32 in the front-rear direction. The support portion main body 34 is formed in the shape of a flat plate. As illustrated in FIG. 1, a rotation mechanism 35 provided between the support member 30 and the seat S is attached to the support portion main body 34.

The rotation mechanism 35 is made of metal, and includes a base mount 36 that is fixed to the support portion main body 34, and a seat mount 37 that is rotatably mounted onto the base mount 36.

As illustrated in FIG. 2, the base mount 36 is formed in the shape of a circular flat plate. The base mount 36 is fixed to the support portion main body 34 by means of bolt fastening or the like.

The seat mount 37 is formed in the shape of a circular flat shape that is slightly smaller than the base mount 36. The seat mount 37 is fixed to the bottom surface of the seat S by means of bolt fastening or the like. The seat mount 37 is rotatably mounted to the inner side of the base mount 36 with a bearing or the like therebetween. Accordingly, the seat S rotates on the floor part F due to the seat mount 37 rotating relative to the base mount 36.

The power supply device 10 includes a power transmission unit 40 that is attached to the floor part F, and a power receiving unit 70 that receives power from the power transmission unit 40 in a contactless fashion.

Figure 4:
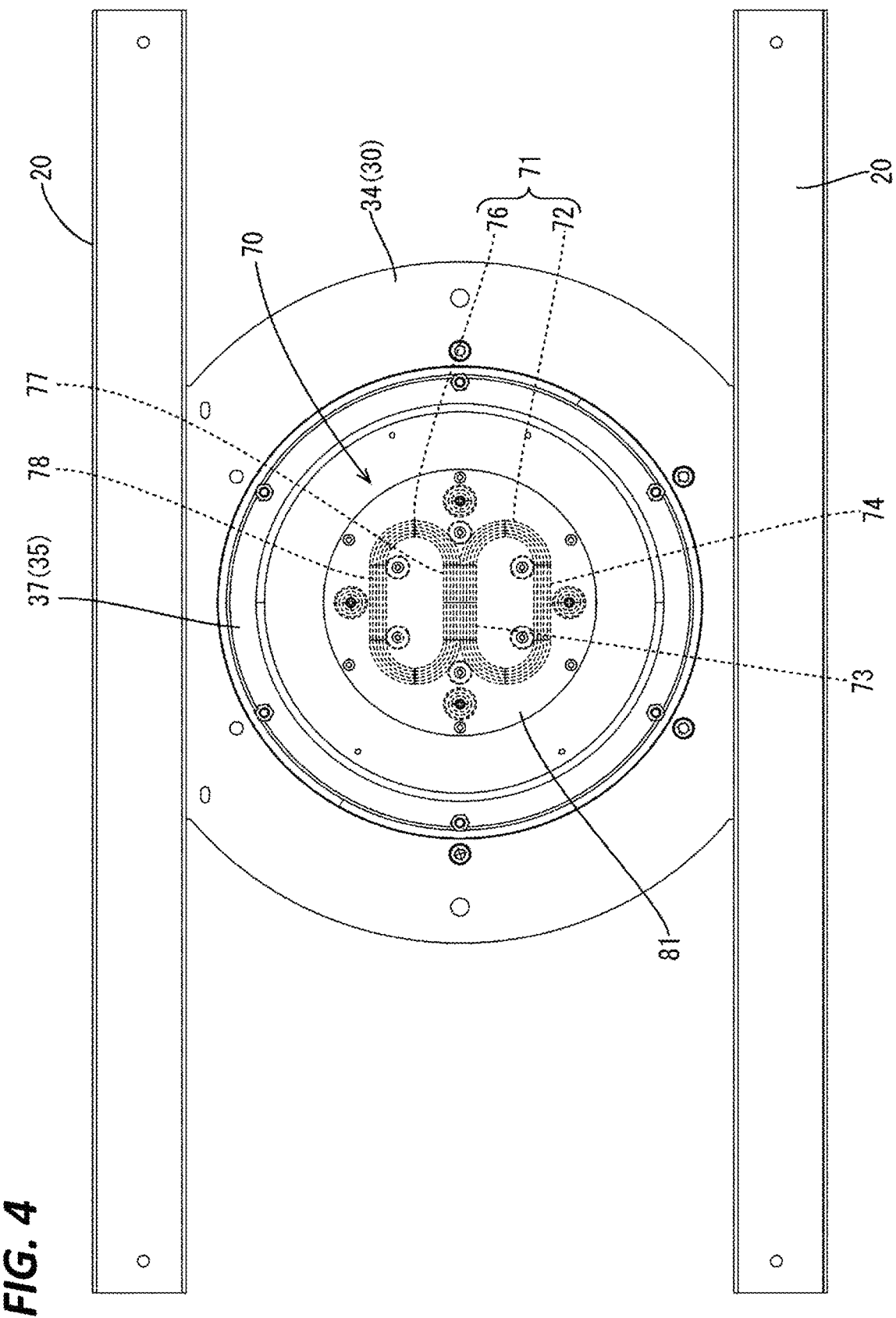
FIG. 4 is a bottom view illustrating a state in which the power receiving unit is attached to the bottom part of a seat.
Figure 6:
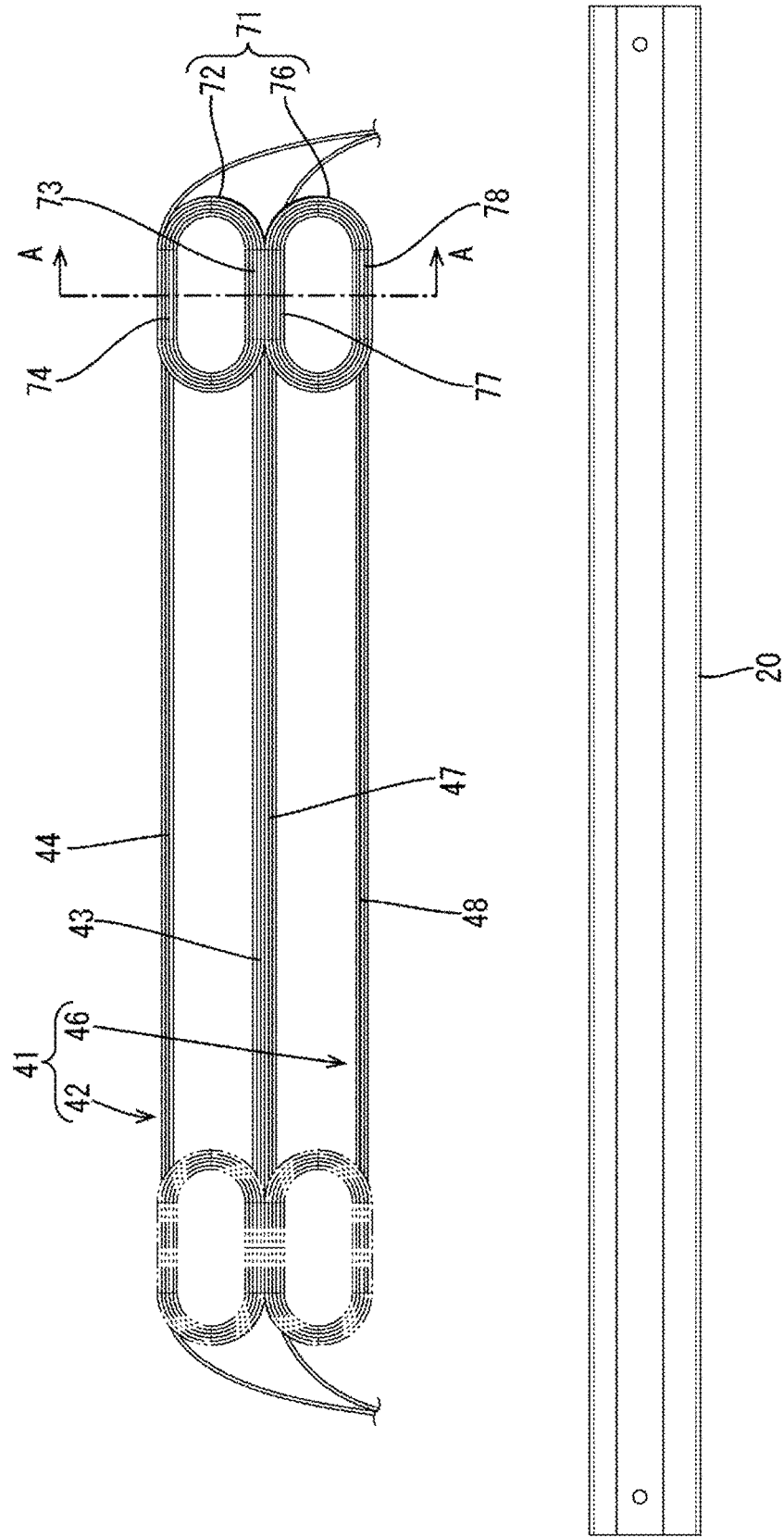
FIG. 6 is a plan view illustrating a state in which a power receiving coil is positioned above a power transmission coil.

As illustrated in FIGS. 2, 4, and 6, the power transmission unit 40 is positioned to extend in the front-rear direction between the pair of rails 20. The power transmission unit 40 includes a power transmission coil 41 that is formed by winding a winding wire. The power transmission coil 41 includes a first annular power transmission coil 42 that has an annular shape and that is elongated in the front-rear direction, and a second annular power transmission coil 46 that has an annular shape, that is elongated in the front-rear direction, and that is positioned alongside the first annular power transmission coil 42.

The first annular power transmission coil 42 is formed in an elliptical shape including a first extended power transmission portion 43 that extends in the front-rear direction, and a first outer extended power transmission portion 44 that extends in the front-rear direction in parallel with the first extended power transmission portion 43.

The second annular power transmission coil 46 is formed in an elliptical shape including a second extended power transmission portion 47 that extends in the front-rear direction adjacent to the first extended power transmission portion 43, and a second outer extended power transmission portion 48 that extends in the front-rear direction in parallel with the second extended power transmission portion 47.

The first and second annular power transmission coils 42 and 46 are formed in a state in which the first and second annular power transmission coils 42 and 46 are connected in series so that the direction of a current in the first extended power transmission portion 43 and the direction of a current in the second extended power transmission portion 47 are the same. Accordingly, the power transmission coil 41 including the first and second annular power transmission coils 42 and 46 is formed in the shape of the numeral 8.

Figure 7:
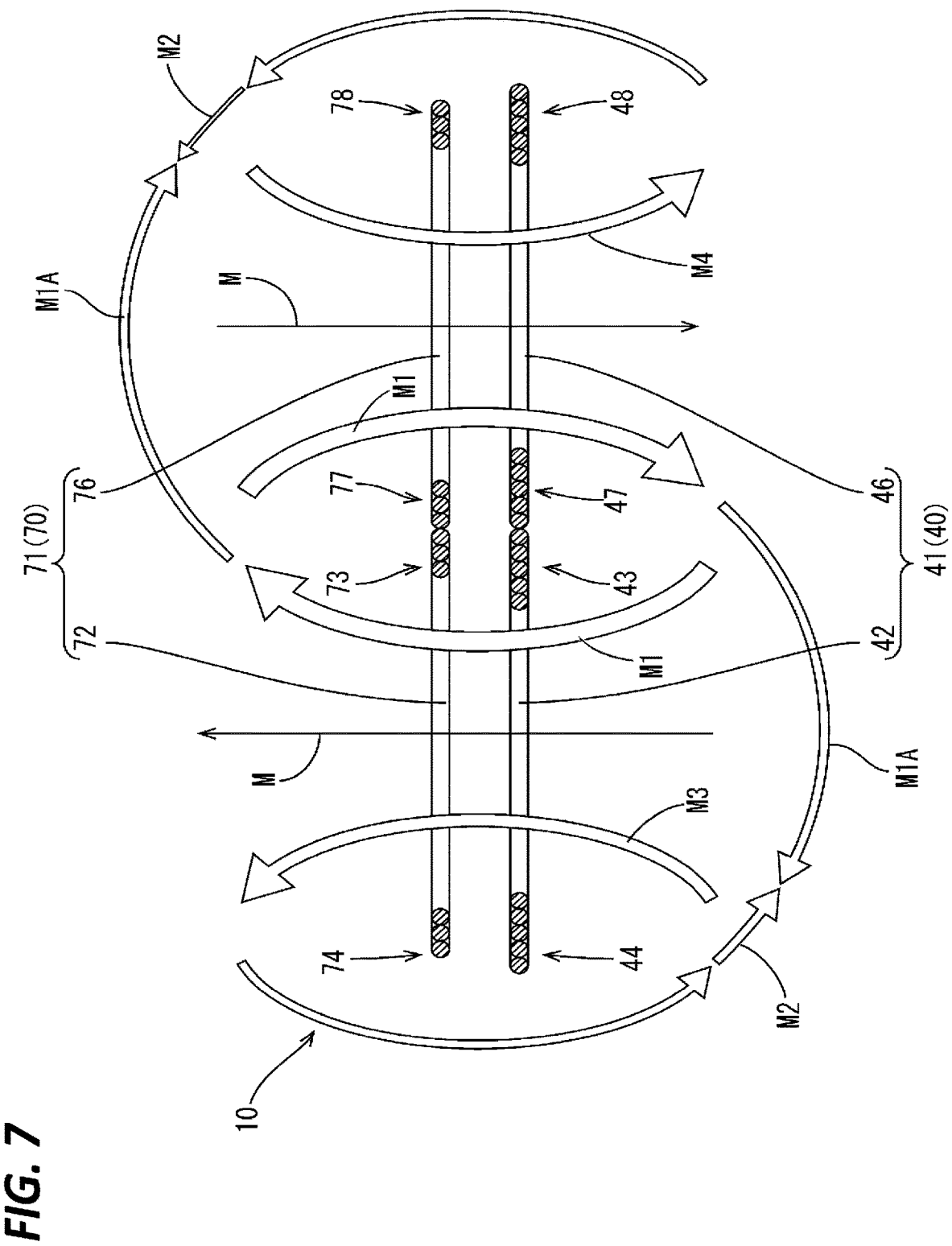
FIG. 7 is a schematic diagram illustrating a state of magnetic fluxes of the power transmission coil in the A-A cross section in FIG. 6.

That is, when a current flows in the power transmission coil 41, magnetic fluxes M having the same intensity and mutually opposite directions that correspond to the direction of current flow are generated according to the right hand rule in the first and second annular power transmission coils 42 and 46 as illustrated in FIG. 7. Then, magnetic fluxes M1 of the first and second extended power transmission portions 43 and 47 efficiently strengthen one another by forming an annular shape about the portion where the first and second extended power transmission portions 43 and 47 are positioned.

On the other hand, magnetic fluxes generated in the first and second outer extended power transmission portions 44 and 48 include leakage fluxes M2, such as magnetic fluxes that radiate outward without linking with the power receiving unit 70, and magnetic fluxes that leak outward from the first and second annular power transmission coils 42 and 46. However, since such leakage fluxes M2 have directions opposite from magnetic fluxes M1A that are parts of the magnetic fluxes M1 mutually strengthened in the first and second extended power transmission portions 43 and 47 as illustrated in FIG. 7, the leakage fluxes M2 are weakened by the magnetic fluxes M1A.

As illustrated in FIGS. 2 and 3, the power receiving unit 70 includes a power receiving coil 71 in which inductive power is generated by the magnetic fluxes M of the power transmission coil 41, a mounting plate 81 onto which the power receiving coil 71 is mounted, and a plurality of attachment rods 85 for attaching the mounting plate 81 to the bottom part of the seat S.

The plurality of attachment rods 85 are formed in substantially columnar shapes. The plurality of attachment rods 85 are provided on the bottom surface of the seat mount 37 in a state in which the attachment rods 85 extend downward from the seat S The mounting plate 81 is formed in the shape of a thin circular flat plate. The mounting plate 81 is fixed to the bottom surfaces of the plurality of attachment rods 85 by means of bolt fastening or the like so that the mounting plate 81 is positioned immediately above the power transmission coil 41 in the power transmission unit 40 facing the power transmission coil 41.

Figure 5:
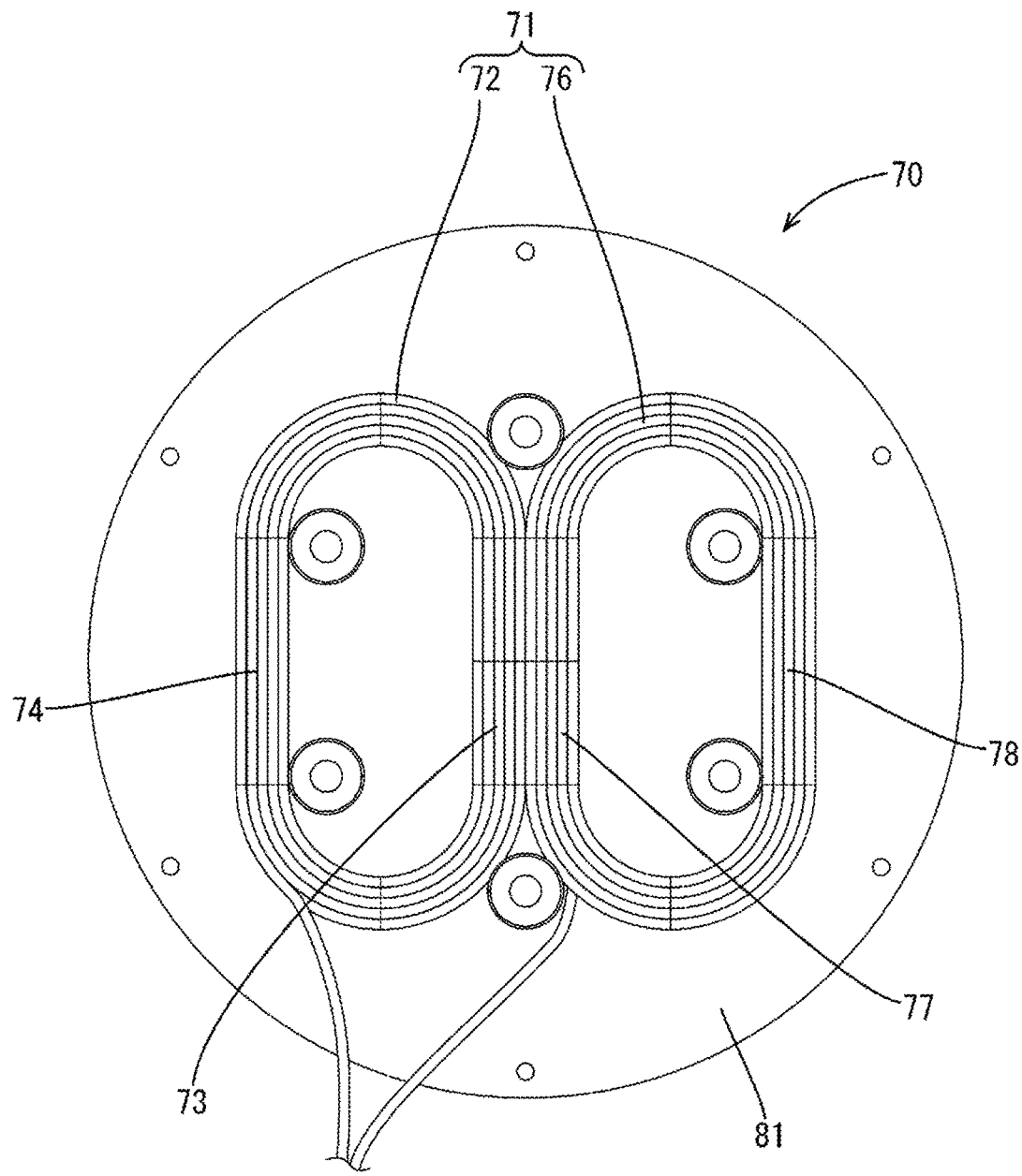
FIG. 5 is an enlarged plan view illustrating the main part of a power receiving unit.

As illustrated in FIG. 5, the power receiving coil 71 is formed by winding a winding wire, and is fixed to the mounting plate 81. The power receiving coil 71 may be fixed to the mounting plate 81 according to known fixing methods, such as joining the power receiving coil 71 to the mounting plate 81 through ultrasonic welding or thermal welding, or fixing the power receiving coil 71 to the mounting plate 81 using an adhesive or a pressure-sensitive adhesive. Alternatively, the power receiving coil 71 may be fixed by being sandwiched in the top-bottom direction by the mounting plate 81 and a plate-shaped holding part or the like that is not illustrated in the drawings.

As illustrated in FIGS. 2, 4, and 6, the power receiving coil 71 includes a first annular power receiving coil 72 and a second annular power receiving coil 76 that have annular shapes, and when the seat S is facing forward, which is the direction in which the vehicle advances, the first annular power receiving coil 72 is positioned so as to be elongated in the front-rear direction and the second annular power receiving coil 76 is positioned so as to be elongated in the front-rear direction next to the first annular power receiving coil 72.

As illustrated in FIG. 6, the first annular power receiving coil 72 is formed in an elliptical shape including a first extended power receiving portion 73 that extends in the front-rear direction along the first extended power transmission portion 43 of the power transmission unit 40, and a first outer extended power receiving portion 74 that extends in the front-rear direction in parallel with the first extended power receiving portion 73 and extends in the front-rear direction along the first outer extended power transmission portion 44.

The second annular power receiving coil 76 is formed in an elliptical shape including a second extended power receiving portion 77 that extends in the front-rear direction along the first extended power receiving portion 73 and extends in the front-rear direction along the second extended power transmission portion 47 of the power transmission unit 40, and a second outer extended power receiving portion 78 that extends in the front-rear direction in parallel with the second extended power receiving portion 77 and extends in the front-rear direction along the second outer extended power transmission portion 48.

In other words, as illustrated in FIG. 1, the first and second extended power receiving portions 73 and 77 are positioned immediately above the first and second extended power transmission portions 43 and 47 with the mounting plate 81 therebetween. Accordingly, as illustrated in FIG. 7, the first and second extended power receiving portions 73 and 77 are positioned inside magnetic fluxes M1 having an annular shape about the first and second extended power transmission portions 43 and 47.

Thus, inductive power is generated in the first and second extended power receiving portions 73 and 77 as a result of magnetic fields around the first and second extended power receiving portions 73 and 77 changing due to the magnetic fluxes M1.

On the other hand, the first outer extended power receiving portion 74 is positioned immediately above the first outer extended power transmission portion 44 with the mounting plate 81 therebetween, and is positioned inside a magnetic flux M3 generated by the first outer extended power transmission portion 44. Furthermore, the second outer extended power receiving portion 78 is positioned immediately above the second outer extended power transmission portion 48 with the mounting plate 81 therebetween, and is positioned inside a magnetic flux M4 generated by the second outer extended power transmission portion 48. Accordingly, as illustrated in FIG. 7, inductive power is generated in the first and second outer extended power receiving portions 74 and 78 as a result of magnetic fields around the first and second outer extended power transmission portions 44 and 48 changing, respectively.

Figure 8:
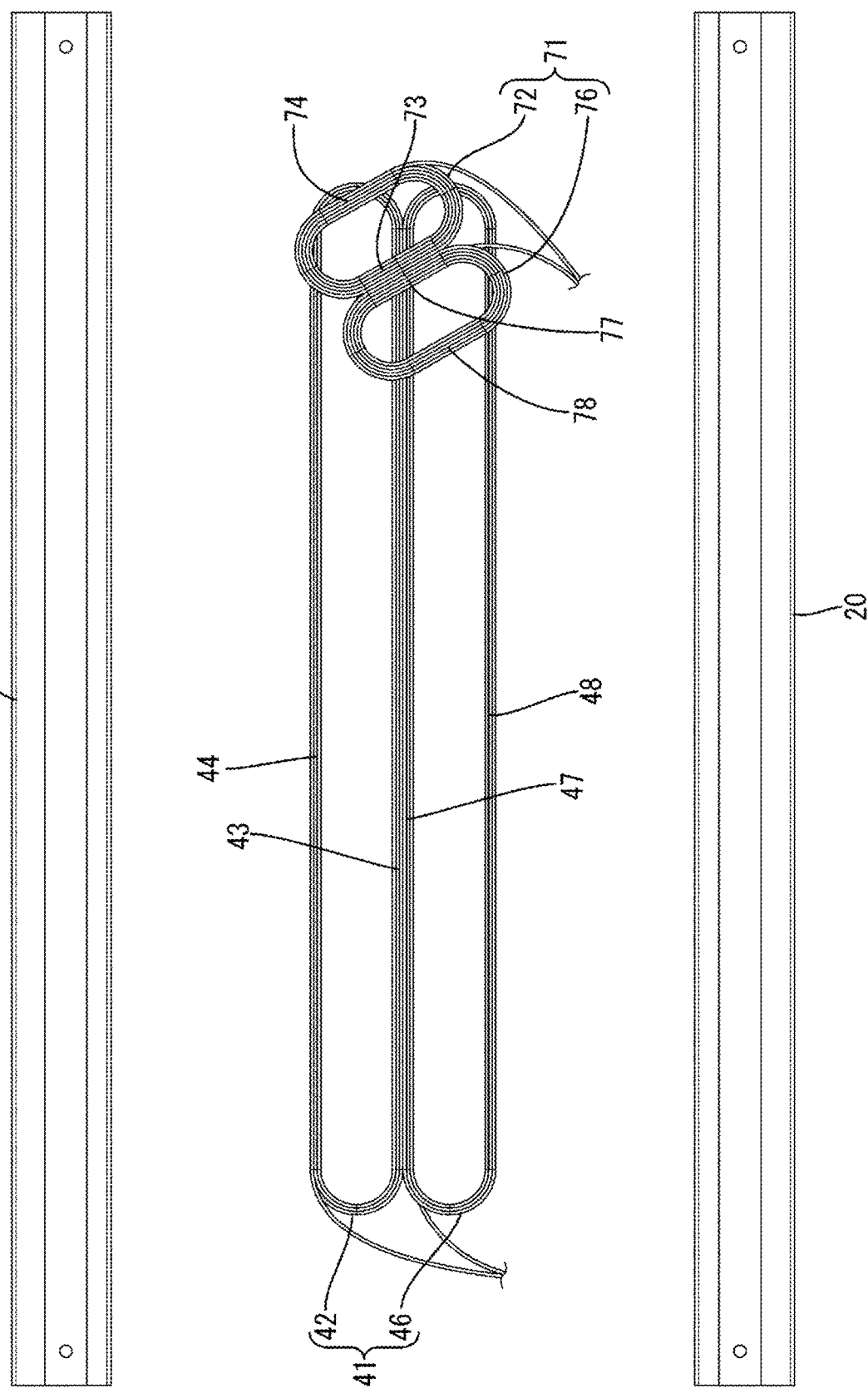
FIG. 8 is a plan view illustrating a state in which the power receiving coil has rotated 60 degrees above the power transmission coil.

Furthermore, as illustrated in FIGS. 5 and 6, the length dimension of the power receiving coil 71 of the power receiving unit 70 in the front-rear direction is set to be less than or equal to the length dimension of the power transmission coil 41 of the power transmission unit 40 in the front-rear direction, and the length dimension of the power receiving coil 71 in the left-right direction (direction that is orthogonal to the front-rear direction) is set to be substantially the same as the length dimension of the power transmission coil 41 in the left-right direction. Furthermore, if the seat S rotates, the power receiving coil 71 pivots about the position where the first extended power receiving portion 73 of the first annular power receiving coil 72 and the second extended power receiving portion 77 of the second annular power receiving coil 76 are positioned, as illustrated in FIG. 8. That is, the first and second extended power receiving portions 73 and 77 in the power receiving installation coil 71 rotate as the seat S rotates, and are positioned within an area in which the power transmission coil 41 is installed even in the rotated state.

Accordingly, if the seat S rotates, by means of the rotation mechanism 35, by 60 degrees ($\pi/3$ radians) to the left and the right (120 degrees ($2\pi/3$ radians) in total) from the forward direction, which is the direction in which the vehicle advances, as illustrated in FIG. 8, for example, the first and second extended power receiving portions 73 and 77 are displaced from the first and second extended power transmission portions 43 and 47 in the direction of rotation. However, in the power receiving coil 71, the first and second extended power receiving portions 73 and 77 receiving power from the first and second extended power transmission portions 43 and 47 of the power transmission unit 40 are positioned within an installation area in which the power transmission coil 41 is installed. Furthermore, in the power transmission unit 40, the magnetic fluxes M1 of the first and second extended power transmission portions 43 and 47 efficiently strengthen one another.

That is, according to the present embodiment, even if the power receiving coil 71 is displaced from the power transmission coil 41 in the rotation direction due to rotation of the seat S, inductive power can be generated in the first and second extended power receiving portions 73 and 77 by the mutually-strengthened magnetic fluxes M1 of the first and second extended power transmission portions 43 and 47.

The present embodiment has a configuration as described above, and the actions and effects of the power supply device 10 will be described next.

For example, in a power supply device which includes a power supplying unit that is provided standing upright on a floor part of a vehicle compartment and a power receiving unit that is provided in a leg part of a seat, and in which the power supplying unit and the power receiving unit face one another in a front-rear direction, if the seat is provided with a rotation function and rotates even slightly, the power receiving unit and the power supplying unit no longer face one another and power cannot be supplied from the power supplying unit to the power receiving unit.

In view of this, the inventors arrived at the configuration of the present embodiment through earnest research to solve the above-described problem. That is, the present embodiment provides a power supply device 10 for a seat S that can slide and rotate relative to a floor part F of a vehicle, the power supply device 10 including: a power transmission unit 40 that is provided on the floor part F and that extends along the front-rear direction (slide direction) in which the seat S slides; and a power receiving unit 70 that is provided to the seat S and that receives power from the power transmission unit 40 in a contactless fashion, wherein the power transmission unit 40 is provided so that the length dimension thereof in the front-rear direction is longer than the length dimension thereof in the left-right direction, which is orthogonal to the front-rear direction, and a part (first and second extended power receiving portions 73 and 77) of the power receiving unit 70 that receives power from the power transmission unit 40 is positioned close to the power transmission unit 40 within an installation area of the power transmission unit 40 while the seat S slides and rotates.

Furthermore, the power transmission unit 40 includes a power transmission coil 41 that is formed by winding a winding wire, and the power receiving unit 70 includes a power receiving coil 71 which is formed by winding a winding wire and in which inductive power is generated by magnetic fluxes M of the power transmission coil 41.

Thus, according to the power supply device 10 having the above-described configuration, the part of the power receiving unit 70 that receives power from the power transmission unit 40 is positioned close to the power transmission unit 40 within the installation area of the power transmission unit 40 even when the seat S slides and rotates, and power can therefore be supplied in a contactless fashion according to an electromagnetic induction method to the seat S, which can slide and rotate.

Furthermore, the power transmission coil 41 includes: a first annular power transmission coil 42 that includes a first extended power transmission portion 43 that extends in the front-rear direction; and a second annular power transmission coil 46 which includes a second extended power transmission portion 47 that extends in the front-rear direction along the first extended power transmission portion 43, and in which the direction of a current in the second extended power transmission portion 47 is the same as the direction of a current in the first extended power transmission portion 43. In addition, the power receiving coil 71 includes: a first annular power receiving coil 72 that includes a first extended power receiving portion 73 that extends in the front-rear direction along the first extended power transmission portion 43 when the seat S is facing forward, which is the direction in which the vehicle advances; and a second annular power receiving coil 76 which includes a second extended power receiving portion 77 that extends in the front-rear direction along the first extended power receiving portion 73 and the second extended power transmission portion 47 when the seat S is facing forward, and in which the direction of a current in the second extended power receiving portion 77 is the same as the direction of a current in the first extended power receiving portion 73.

That is, according to the above-described configuration, a magnetic flux M generated by the first annular power transmission coil 42 and a magnetic flux M generated by the second annular power transmission coil 46 act in opposite directions, and magnetic fluxes M1 having an annular shape are generated about the part where the first and second extended power transmission portions 43 and 47 are positioned. Thus, magnetic fluxes M1 of the first and second extended power transmission portions 43 and 47 of the power transmission unit 40 are mutually strengthened. Furthermore, inductive power can be generated by changing the magnetic fields around the first and second extended power receiving portions 73 and 77 of the power receiving unit 70 by means of the strengthened magnetic fluxes M1.

Accordingly, the above-described configuration improves the efficiency with which power is supplied in a contactless fashion to the seat S compared to a case in which power is supplied with a power transmission coil and a power receiving coil configured to have circular shapes, for example.

Incidentally, in the electromagnetic induction method, magnetic fluxes that do not link with the power receiving coil 71 of the power receiving unit 70 and magnetic fluxes radiated outward from the power transmission coil 41, included in the magnetic fluxes M of the power transmission coil 41 of the power transmission unit 40, usually become leakage fluxes M2. Thus, in a case in which power is to be supplied to the power receiving unit 70 provided to the seat S using the magnetic fluxes M of the power transmission unit 40 provided on the floor part F, there is a concern that the magnetic fluxes of the power transmission unit 40 will leak to the outside.

However, according to the above-described configuration, the magnetic flux M generated by the first annular power transmission coil 42 and the magnetic flux M generated by the second annular power transmission coil 46 act in opposite directions. That is, magnetic fluxes outside the part where the first and second extended power transmission portions 43 and 47 are positioned are weakened by magnetic fluxes M1A that are part of the magnetic fluxes M1 strengthened at the first and second extended power transmission portions 43 and 47, and the leakage fluxes M2 from the power transmission coil 41 can be suppressed.

Furthermore, since the first and second annular power transmission coils 42 and 46 are connected in series, the circuit configuration of the power transmission unit 40 can be simplified. Furthermore, the current in the first annular power transmission coil 42 and the current in the second annular power transmission coil 46 can be equalized.

That is, the magnetic flux M generated by the first annular power transmission coil 42 and the magnetic flux M generated by the second annular power transmission coil 46 can be easily set to the same intensity. Thus, the magnetic fluxes M1 of the first and second extended power transmission portions 43 and 47 can efficiently strengthen one another compared to a case in which there is a difference between the magnetic flux generated by the first annular power transmission coil and the magnetic flux generated by the second annular power transmission coil, for example.

Figure 9:
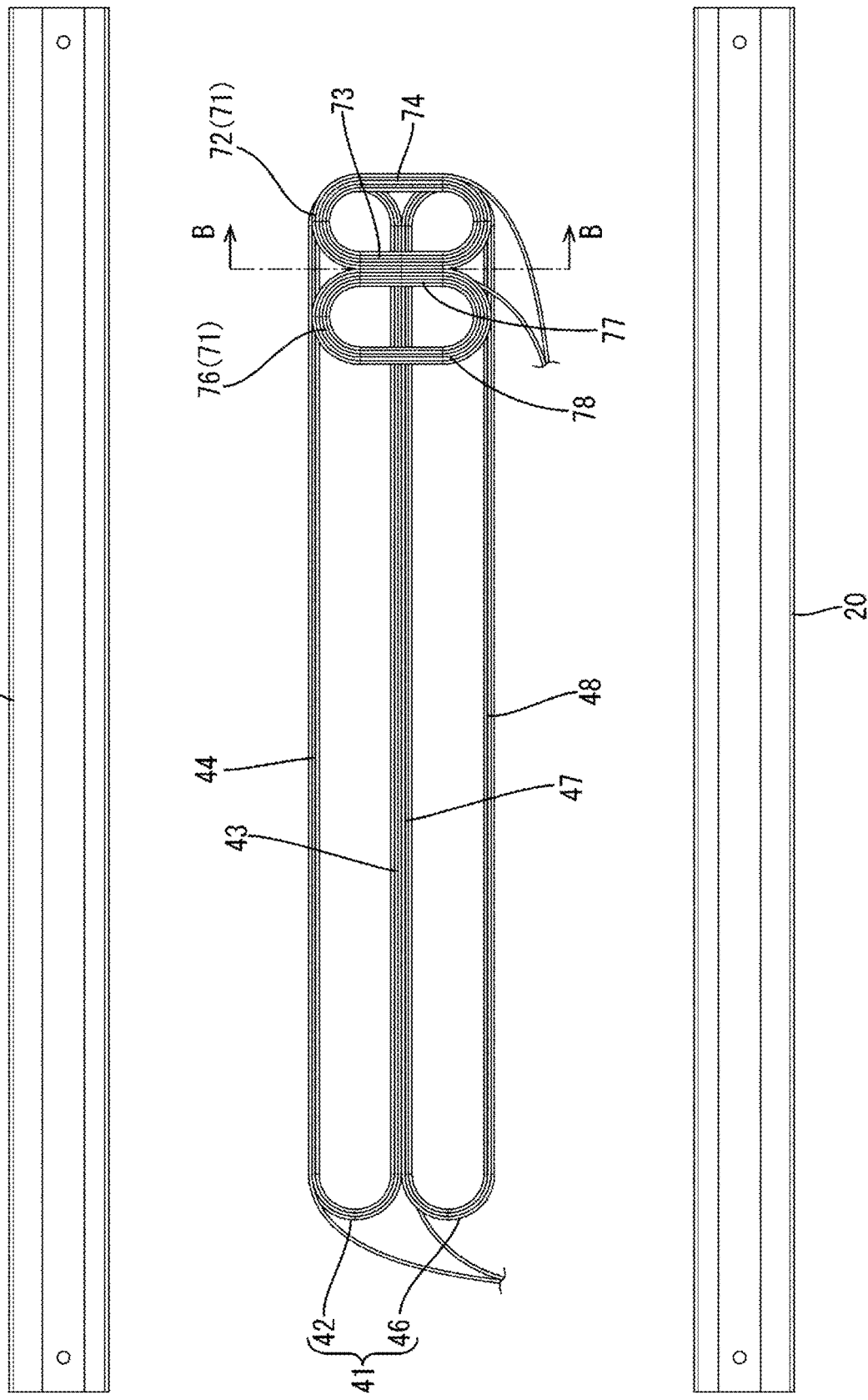
FIG. 9 is a plan view illustrating a state in which the power receiving coil has rotated 90 degrees above the power transmission coil.
Figure 10:
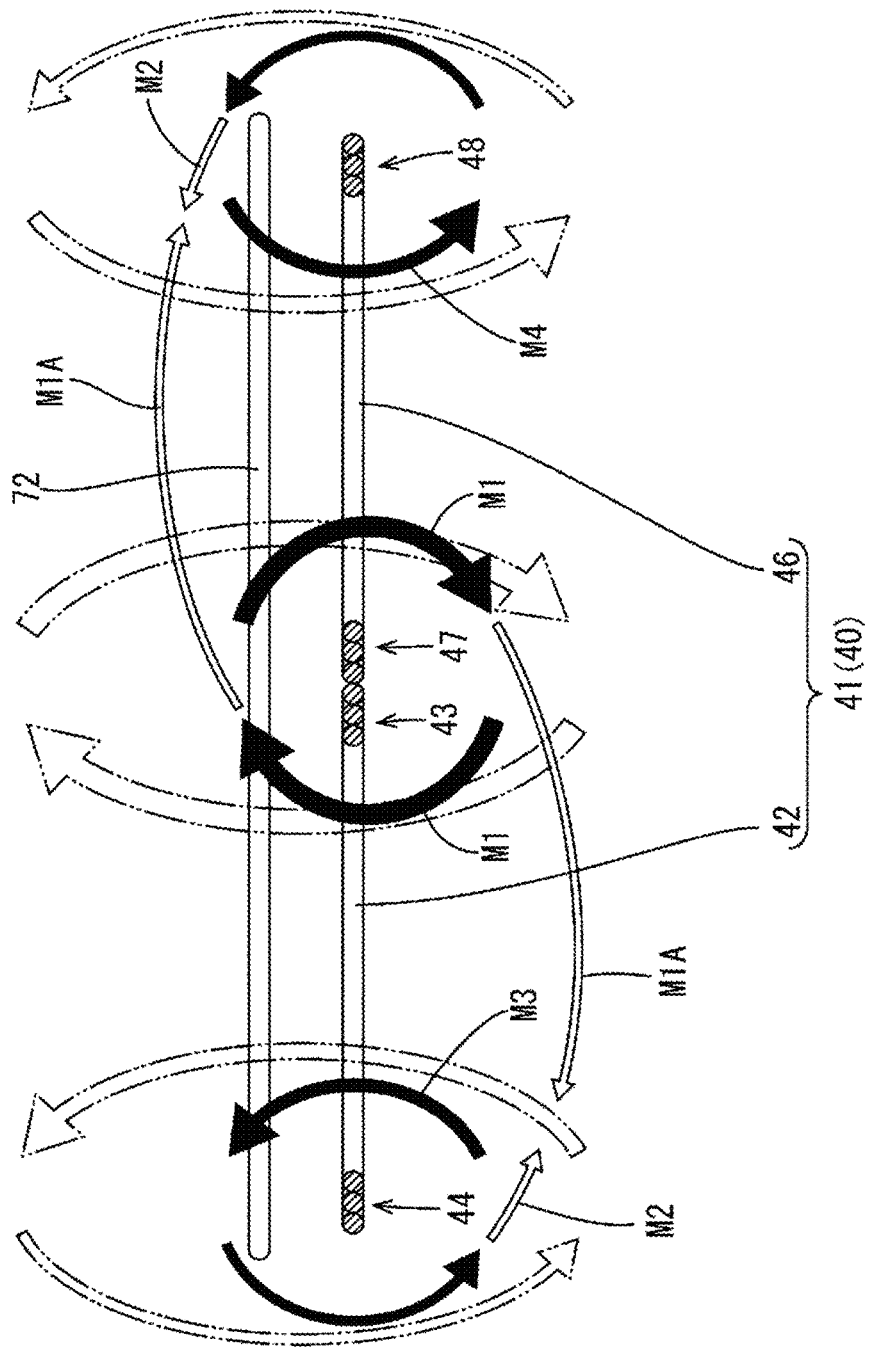
FIG. 10 is a schematic diagram illustrating a state of the magnetic fluxes of the power transmission coil in the B-B cross section in FIG. 9.

Furthermore, when the seat S has rotated 90 degrees ($\pi/2$ radians) to the left or to the right orthogonally to the direction in which the vehicle advances as illustrated in FIGS. 9 and 10, the first and second extended power receiving portions 73 and 77 are orthogonal to the first and second extended power transmission portions 43 and 47. Thus, inductive power can be generated in the first and second extended power receiving portions 73 and 77 even though the effect of the magnetic fluxes M1 on the first and second extended power receiving portions 73 and 77 is weakened.

Here, as illustrated in FIG. 10, leakage fluxes M2 leaking from the magnetic flux M3 of the first outer extended power transmission portion 44 and the magnetic flux M4 of the second outer extended power transmission portion 48 are weakened by magnetic fluxes M1A that are parts of the magnetic fluxes M1 strengthened at the first and second extended power transmission portions 43 and 47. That is, according to the present embodiment, the leakage fluxes M2 from the power transmission coil 41 can be suppressed even if the seat S rotates 90 degrees.

Embodiment 2

Next, embodiment 2 will be described with reference to FIGS. 11 and 12.

A power receiving unit 170 in embodiment 2 includes an auxiliary power receiving coil 91 in addition to the power receiving coil 71 in embodiment 1. The configurations, actions, and effects that embodiment 2 has in common with embodiment 1 are redundant and a description thereof will thus be omitted. Furthermore, the same symbols will be used for configurations that embodiment 2 has in common with embodiment 1.

Figure 11:
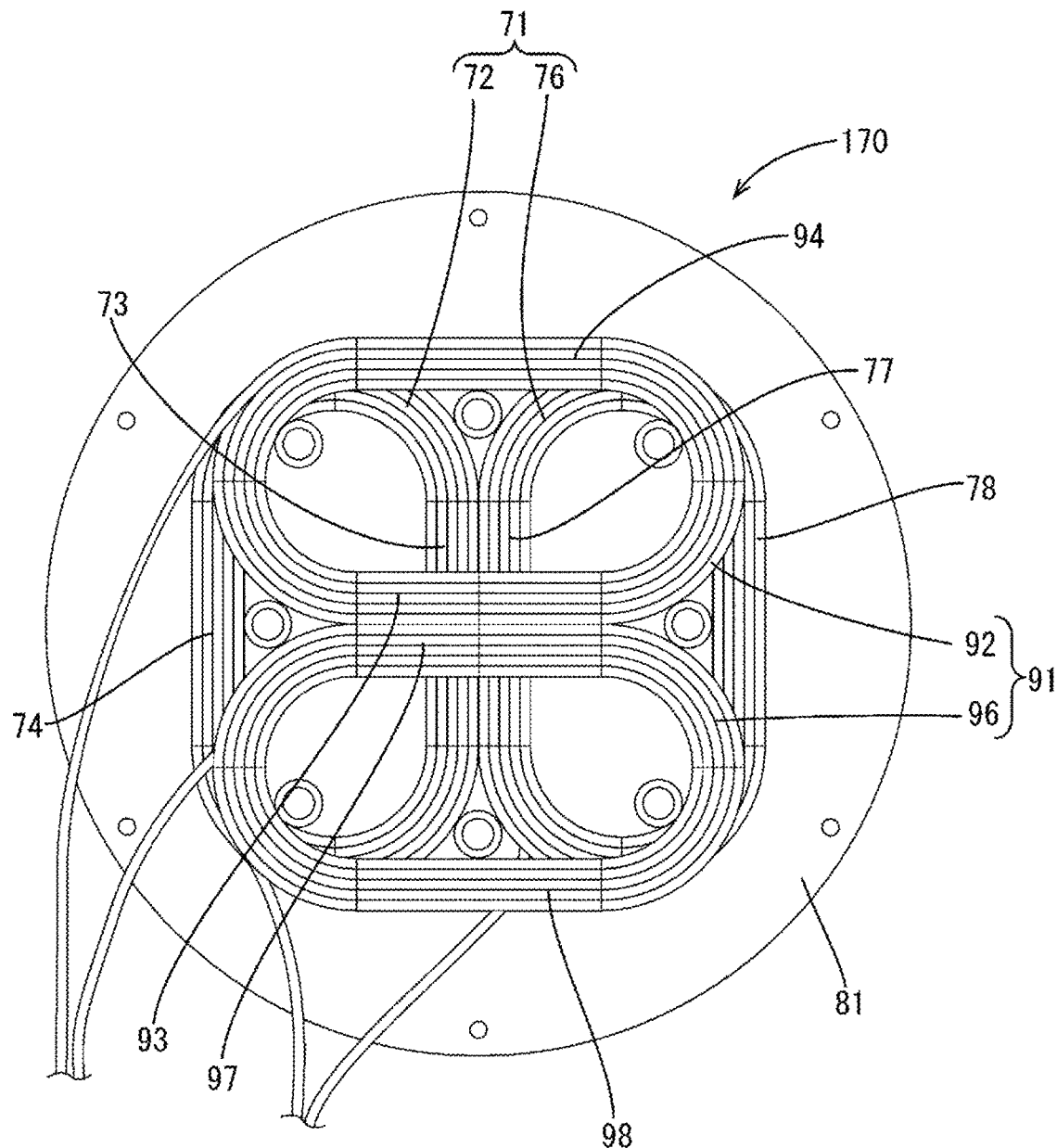
FIG. 11 is an enlarged plan view illustrating the main part of a power receiving unit pertaining to embodiment 2.

As illustrated in FIG. 11, the auxiliary power receiving coil 91 in the power receiving unit 170 in embodiment 2 has a configuration similar to that of the power receiving coil 71, and is positioned in a state in which the auxiliary power receiving coil 91 is displaced from the power receiving coil 71 by 90 degrees ($\pi/2$ radians) about the position of the first and second extended power receiving portions 73 and 77.

Figure 12:
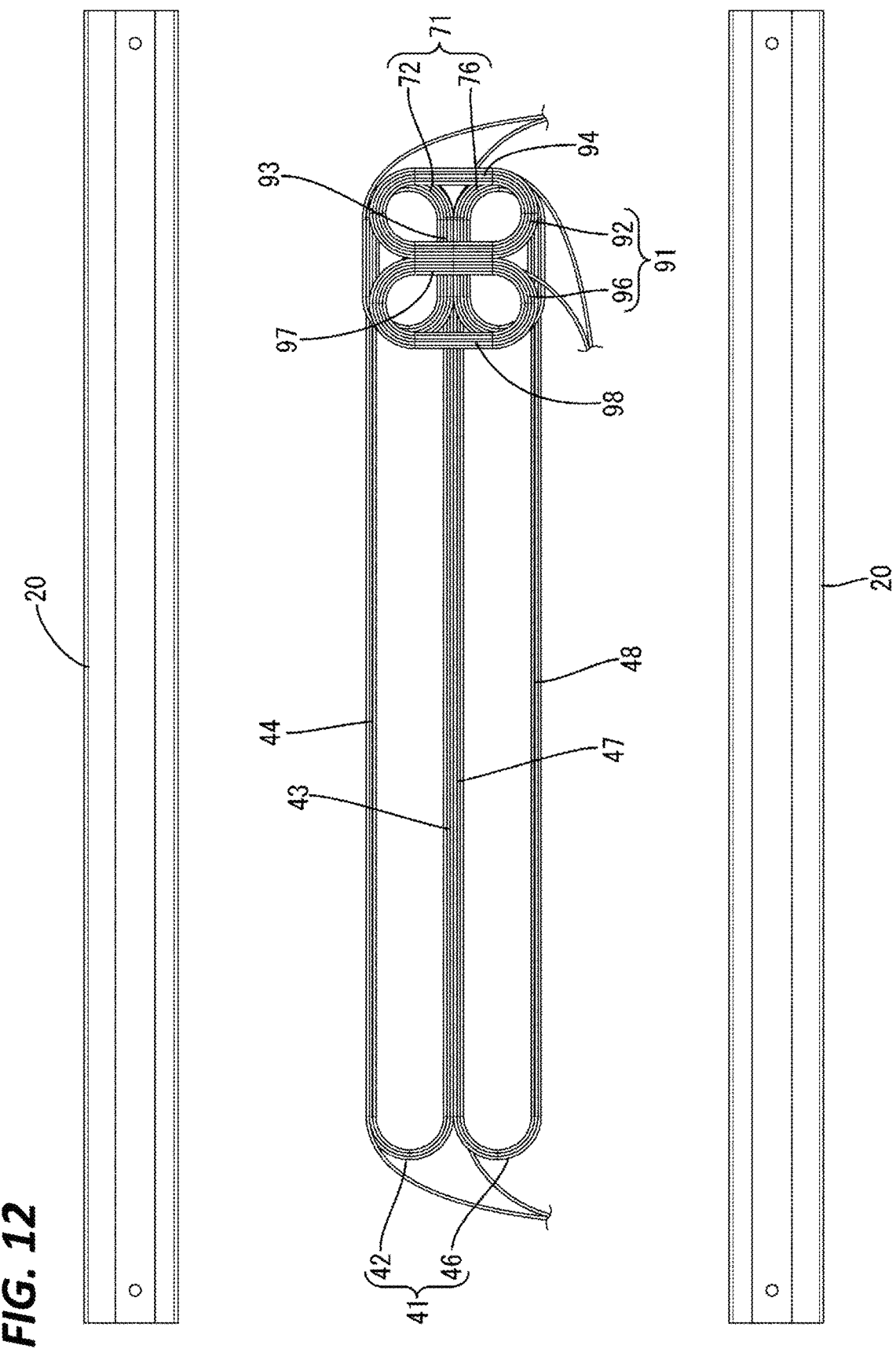
FIG. 12 is a plan view illustrating a state in which power receiving coils are positioned above the power transmission coil.

Specifically, as illustrated in FIG. 12, the auxiliary power receiving coil 91 is formed in an elliptical shape including a first annular auxiliary coil 92 and a second annular auxiliary coil 96 that have annular shapes, and when the seat S is facing forward, which is the direction in which the vehicle advances, the first annular auxiliary coil 92 is positioned so as to be elongated in the left-right direction and the second annular auxiliary coil 96 is positioned so as to be elongated in the left-right direction next to the first annular auxiliary coil 92.

The first annular auxiliary coil 92 is formed in an elliptical shape including a first extended auxiliary portion 93 that extends in the left-right direction orthogonally to the first extended power transmission portion 43, and a first outer extended auxiliary portion 94 that extends in the left-right direction in parallel with the first extended auxiliary portion 93 and that is orthogonal to the first outer extended power transmission portion 44.

The second annular auxiliary coil 96 includes a second extended auxiliary portion 97 that extends in the left-right direction along the first extended auxiliary portion 93 and that is orthogonal to the second extended power transmission portion 47, and a second outer extended auxiliary portion 98 that extends in the left-right direction in parallel with the second extended auxiliary portion 97 and that is orthogonal to the second outer extended power transmission portion 48.

In other words, in the power receiving unit 170 in the present embodiment, the power receiving coil 71 having the shape of the numeral 8 and the auxiliary power receiving coil 91 having the shape of the numeral 8 are orthogonal to one another.

That is, according to the present embodiment, inductive power can be generated in the first and second extended power receiving portions 73 and 77 by the mutually-strengthened magnetic fluxes M1 of the first and second extended power transmission portions 43 and 47 acting on the first and second extended power receiving portions 73 and 77 when the seat S is facing forward, which is the direction in which the vehicle advances.

On the other hand, when the seat S rotates 90 degrees ($\pi/2$ radians) to the left or to the right orthogonally to the direction in which the vehicle advances, the first and second extended power receiving portions 73 and 77 are orthogonal to the first and second extended power transmission portions 43 and 47. Thus, the magnetic fluxes M1 of the first and second extended power transmission portions 43 and 47 hardly act on the first and second extended power receiving portions 73 and 77.

However, according to the present embodiment, when the seat S rotates 90 degrees ($\pi/2$ radians) to the left or to the right, the first and second extended auxiliary portions 93 and 97 are positioned along the first and second extended power transmission portions 43 and 47.

That is, inductive power can be generated in the first and second extended auxiliary portions 93 and 97 by the magnetic fluxes M1 of the first and second extended power transmission portions 43 and 47 acting on the first and second extended auxiliary portions 93 and 97.

That is, according to the present embodiment, power can be supplied in a contactless fashion by the power receiving coil 71 when the seat S is facing forward, and power can be supplied in a contactless fashion by the auxiliary power receiving coil 91 when the seat S rotates 90 degrees ($\pi/2$ radians) to the left or to the right orthogonally to the direction in which the vehicle advances. That is, power can be supplied to the seat S while suppressing a decrease in power supply efficiency through the combination of the power receiving coil 71 and the auxiliary power receiving coil 91. Furthermore, if the seat S rotates to directions other than the forward, left, and right directions, power can be supplied in a contactless fashion to the seat S by both the power receiving coil 71 and the auxiliary power receiving coil 91.

Embodiment 3

Next, embodiment 3 will be described with reference to FIGS. 13 and 14.

A power receiving unit 270 in embodiment 3 includes a plurality of the auxiliary power receiving coils 91 in embodiment 2. The configurations, actions, and effects that embodiment 3 has in common with embodiment 2 are redundant and a description thereof will thus be omitted. Furthermore, the same symbols will be used for configurations that embodiment 3 has in common with embodiment 2.

Figure 13:
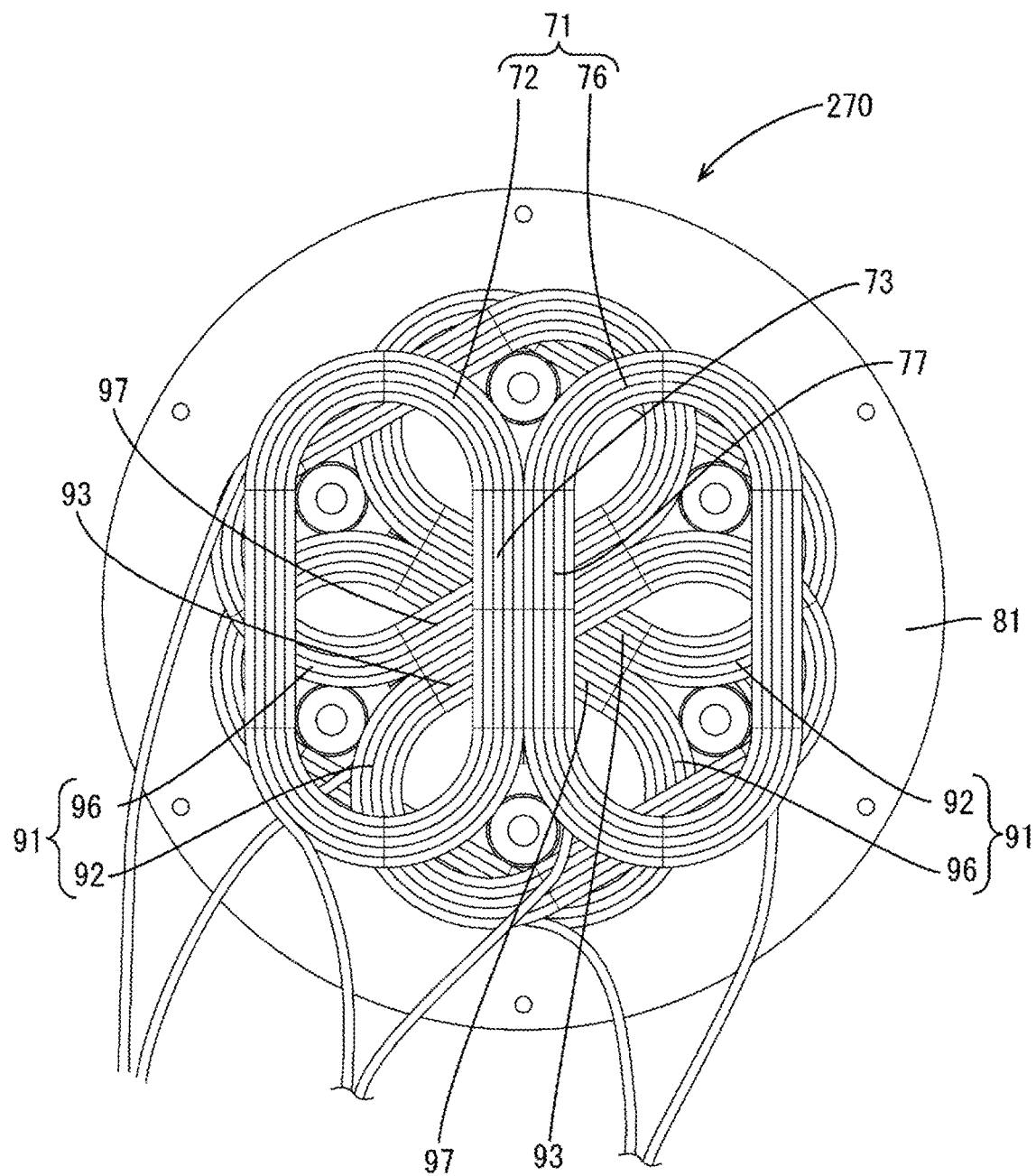
FIG. 13 is an enlarged plan view illustrating the main part of a power receiving unit pertaining to embodiment 3.
Figure 14:
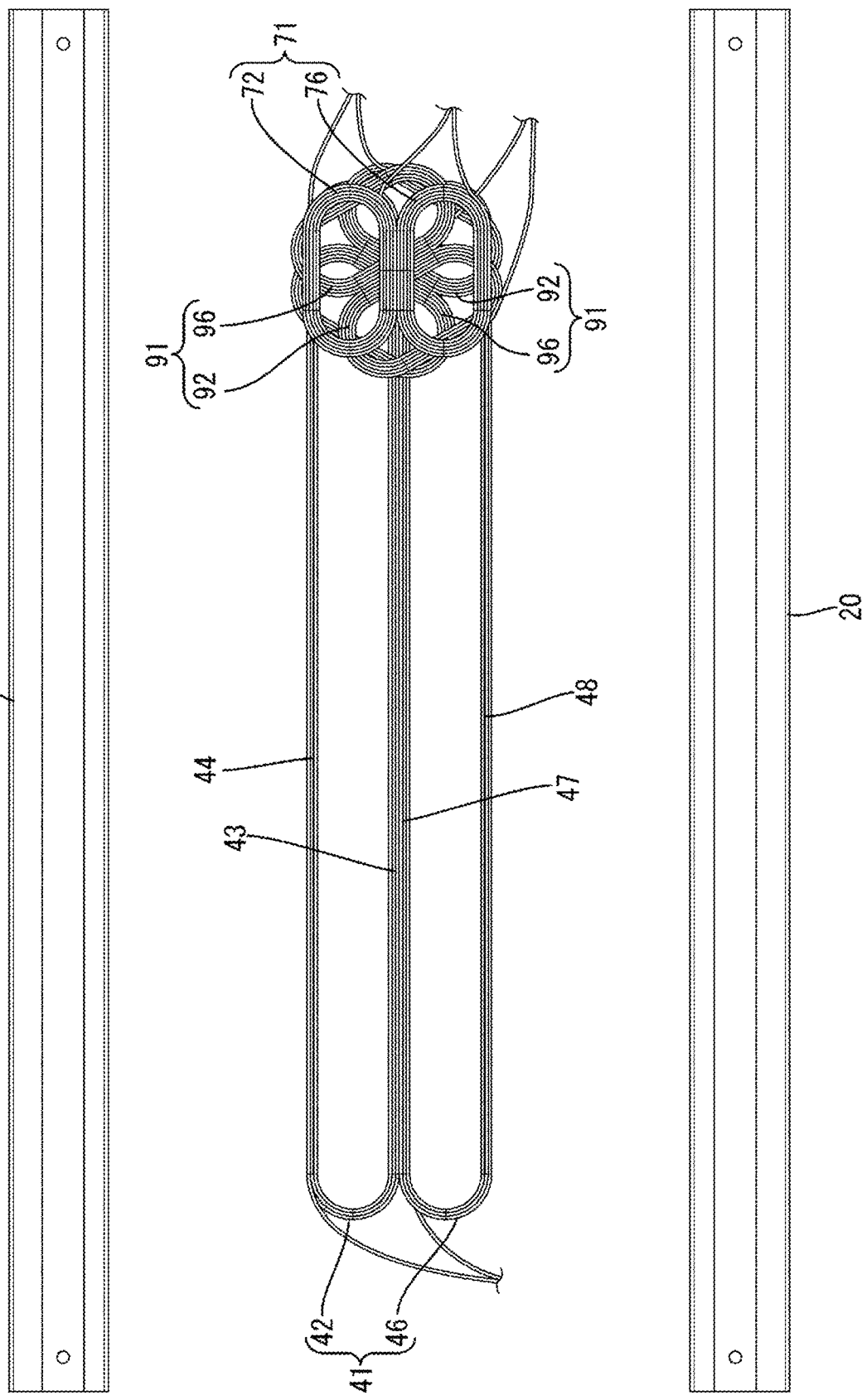
FIG. 14 is a plan view illustrating a state in which power receiving coils are positioned above the power transmission coil.

As illustrated in FIGS. 13 and 14, the power receiving unit 270 in embodiment 3 includes two auxiliary power receiving coils 91. One of the two auxiliary power receiving coils 91 is positioned in a state in which the first and second extended auxiliary portions 93 and 97 are displaced by 120 degrees ($2\pi/3$ radians) in the clockwise direction from the first and second extended power receiving portions 73 and 77 of the power receiving coil 71. The other one of the two auxiliary power receiving coils 91 is positioned in a state in which the first and second extended auxiliary portions 93 and 97 are displaced by 240 degrees ($4\pi/3$ radians) in the clockwise direction from the first and second extended power receiving portions 73 and 77.

That is, the power receiving unit 270 in the present embodiment has a configuration in which a total of three power receiving coils 71 and 91 consisting of the power receiving coil 71 having the shape of the numeral 8 and two auxiliary power receiving coils 91 having the shape of the numeral 8 are placed one on top of another in a state in which the three power receiving coils 71 and 91 are displaced by 120 degrees ($2\pi/3$ radians) from one another.

Accordingly, if the seat S rotates 60 degrees ($\pi/3$ radians) or 120 degrees ($2\pi/3$ radians) to the left or to the right from the direction in which the vehicle advances, the first and second extended auxiliary portions 93 and 97 of one of the two auxiliary power receiving coils 91 is in parallel with the first and second extended power transmission portions 43 and 47, and inductive power can thus be generated in the first and second extended auxiliary portions 93 and 97.

If the seat S rotates 30 degrees ($\pi/6$ radians) or 150 degrees ($5\pi/6$ radians) to the left or to the right from the direction in which the vehicle advances, power can be supplied in a contactless fashion by both the power receiving coil 71 and one of the auxiliary power receiving coils 91.

That is, according to the present embodiment, power can be supplied in a contactless fashion to the seat S while suppressing a decrease in the efficiency with which power is supplied in a contactless fashion to the seat S regardless of the angle to which the seat S rotates.

Experiment Example 1

Next, the embodiments will be described in more detail with reference to experiment example 1.

Figure 15:
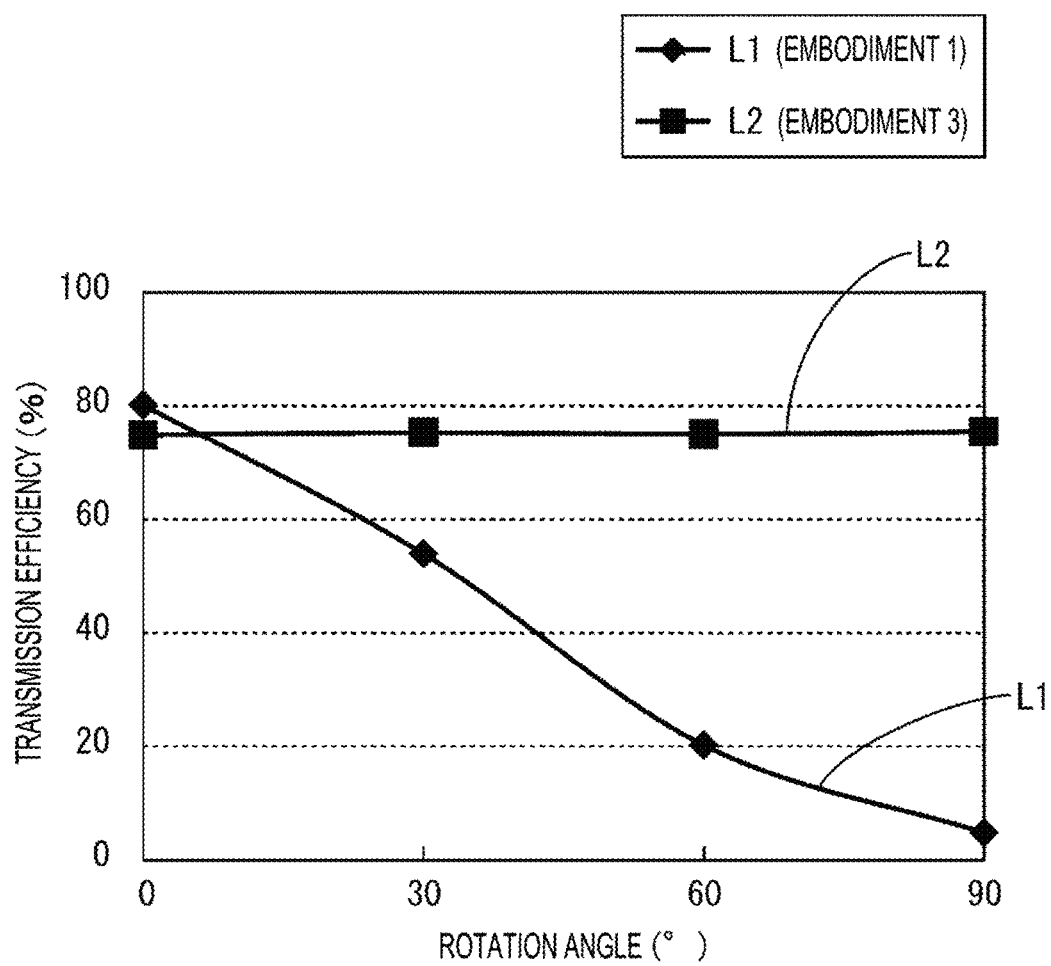
FIG. 15 is a diagram illustrating transmission efficiency in embodiment 1 and embodiment 3.

In the present experiment example, the graph in FIG. 15 shows the transmission efficiency of the power receiving unit 70 (which includes one power receiving coil 71) in embodiment 1 and the transmission efficiency of the power receiving unit 270 (in which a power receiving coil 71 and auxiliary power receiving coils 91 are placed one on top of another in a state in which the coils are displaced by 120 degrees ($2\pi/3$ radians) from one another) in embodiment 3.

In the graph in FIG. 15, the rotation angle [°] of the power receiving coil 71 relative to the power transmission coil 41 is indicated on the X axis, and the transmission efficiency [%] corresponding to the rotation angle of the power receiving coil 71 is indicated on the Y axis. L1 indicates the transmission efficiency in the power receiving unit 70 in embodiment 1, and L2 indicates the transmission efficiency in the power receiving unit 270 in embodiment 3.

Here, when L1 and L2 in the graph in FIG. 15 are referred to, a high transmission effect can be obtained with a transmission efficiency of 75% or higher in both embodiment 1 and embodiment 3 if the orientation of the power receiving coil 71 matches the orientation of the power transmission coil 41 in the power transmission unit 40.

When the seat S rotates and the power receiving coil 71 is rotated and displaced from the power transmission coil 41 by 30 degrees, the transmission efficiency in embodiment 1 (L1) equals 53% and the transmission efficiency in embodiment 3 (L2) equals 75%. Also, when the power receiving coil 71 is rotated and displaced from the power transmission coil 41 by 60 degrees, the transmission efficiency in embodiment 1 (L1) equals 20% and the transmission efficiency in embodiment 3 (L2) equals 75%.

Furthermore, when the power receiving coil 71 is rotated and displaced from the power transmission coil 41 by 90 degrees, the transmission efficiency in embodiment 1 (L1) equals 5% and the transmission efficiency in embodiment 3 (L2) equals 75%.

That is, according to the configuration of embodiment 1, power can be supplied to the seat S with a high transmission efficiency of 50% or higher up to the position where the power receiving unit 70 is rotated and displaced by 30 degrees. Furthermore, according to the configuration of embodiment 3, power can be supplied to the seat S with a high transmission efficiency of 75% regardless of the direction to which the power receiving unit 270 rotates.

Experiment Example 2

Next, the embodiments will be described in more detail with reference to experiment example 2.

In the present experiment example, the magnetic field distribution in the power supply device 10 in embodiment 1 during power transmission is checked using electromagnetic field analysis software.

Figure 16:
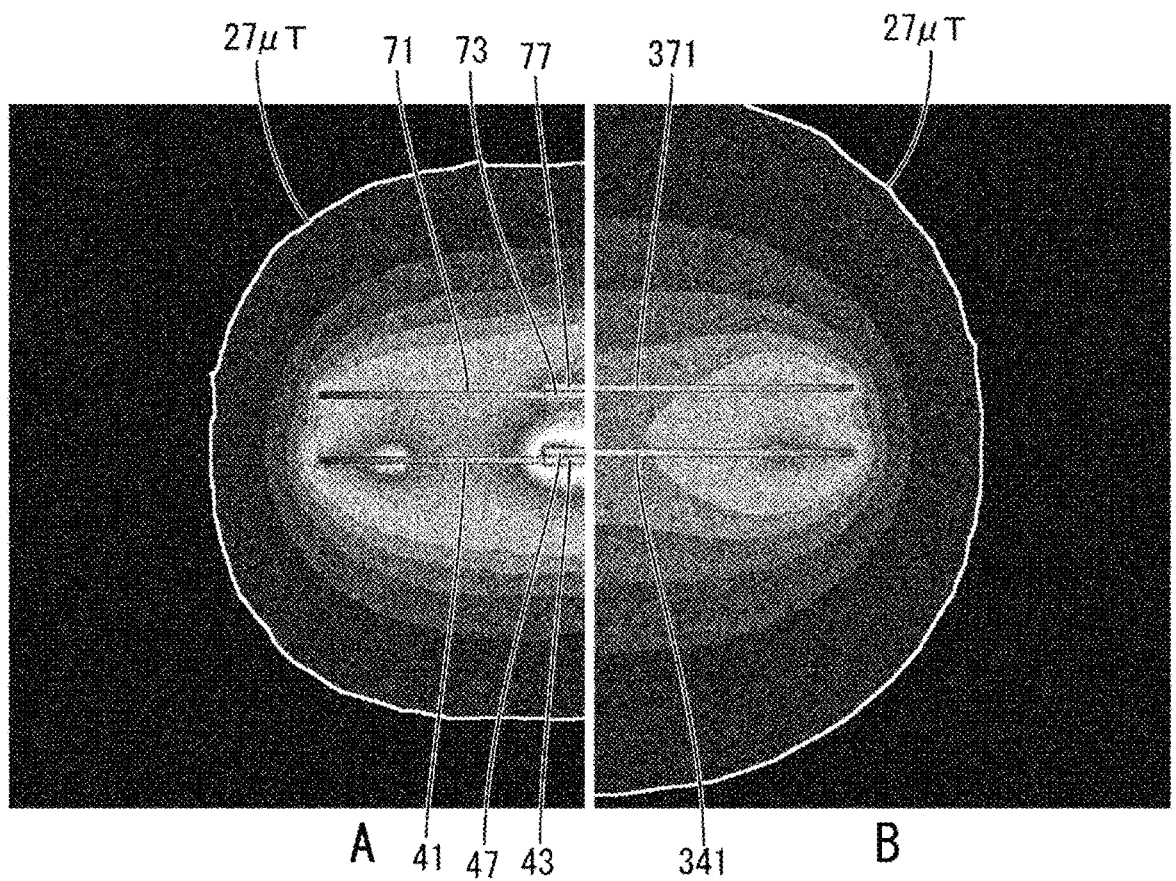
FIG. 16 is a diagram illustrating a magnetic field distribution in the power supply device in embodiment 1 during power transmission.

In FIG. 16, A on the left side of the drawing illustrates a cross section of the left half of the magnetic field distribution in embodiment 1 during power transmission. B on the right side of the drawing illustrates a cross section of the right half of the magnetic field distribution in a circular power transmission coil 341 and a circular power receiving coil 371 during power transmission.

In FIG. 16, the arcuate lines illustrated outside the power receiving coils 71, 371, and the power transmission coils 41, 341 indicate the positions corresponding to an ICNIRP guideline value (27 microtesla (μT)).

That is, according to the power supply device 10 in embodiment 1, the influence of leakage fluxes M2 of the power transmission unit 40 on the outside can be suppressed compared to a power supply device including the circular power transmission coil 341 and the circular power receiving coil 371.

OTHER EMBODIMENTS

The technique disclosed in the present specification is not limited to the embodiments described with reference to the description above and the drawings, and various embodiments such as those in the following, for example, are also included.

(1) In the above-described embodiments, a configuration is adopted in which the first and second annular power transmission coils 42 and 46 are connected in series. However, there is no limitation to this, and a circuit configuration may be adopted in which first and second annular power transmission coils are made independent from one another.

(2) In above-described embodiments 2 and 3, a configuration is adopted in which one or two auxiliary power receiving coils 91 are included. However, there is no limitation to this, and a configuration may be adopted in which three or more auxiliary power receiving coils 91 are included.

(3) In the above-described embodiments, the annular coils 42, 46, 72, 76, 92, and 96 are configured to have elliptical shapes. However, there is no limitation to this, and the annular coils may be configured to have semicircular or polygonal shapes.

LIST OF REFERENCE NUMERALS

10: Power supply device
40: Power transmission unit
41: Power transmission coil
42: First annular power transmission coil
43: First extended power transmission portion
46: Second annular power transmission coil
47: Second extended power transmission portion
70: Power receiving unit
71: Power receiving coil
72: First annular power receiving coil
73: First extended power receiving portion
76: Second annular power receiving coil
77: Second extended power receiving portion
91: Auxiliary power receiving coil
92: First annular auxiliary coil
93: First extended auxiliary portion
96: Second annular auxiliary coil
97: Second extended auxiliary portion
F: Floor part
S: Seat

What is claimed is:

1. A power supply device comprising:
a power transmitter configured to supply power to a seat that can slide and rotate relative to a floor part of a vehicle, the power transmitter being provided on the floor part and extending along a slide direction in which the seat slides; and
a power receiver that is provided to the seat and that receives power from the power transmitter in a contactless fashion,
wherein the power transmitter is provided so that the length dimension thereof in the slide direction is longer than the length dimension thereof in a direction that is orthogonal to the slide direction, and
a part of the power receiver that receives power from the power transmitter is positioned close to the power transmitter within an installation area of the power transmitter while the seat slides and rotates,
wherein the power transmitter includes a power transmission coil that is formed by winding a winding wire,
the power transmission coil includes:
a first annular power transmission coil including a first extended power transmission portion that extends in the slide direction, and
a second annular power transmission coil including a second extended power transmission portion that extends in the slide direction along the first extended power transmission portion, the first annular power transmission coil being connected to the second annular power transmission coil.

2. The power supply device according to claim 1,
wherein
the power receiver includes a power receiving coil which is formed by winding a winding wire and in which inductive power is generated by magnetic fluxes of the power transmission coil.

3. The power supply device according to claim 2,
wherein
the direction of a current in the second extended power transmission portion is the same as the direction of a current in the first extended power transmission portion, and
the power receiving coil includes:
a first annular power receiving coil that includes a first extended power receiving portion that extends in the slide direction along the first extended power transmission portion when the seat is facing the direction in which the vehicle advances; and
a second annular power receiving coil which includes a second extended power receiving portion that extends in the slide direction along the first extended power receiving portion and the second extended power transmission portion when the seat is facing the direction in which the vehicle advances, and in which the direction of a current in the second extended power receiving portion is the same as the direction of a current in the first extended power receiving portion.

4. The power supply device according to claim 3, wherein the first annular power transmission coil and the second annular power transmission coil are connected in series.

5. The power supply device according to claim 3,
wherein the power receiver includes at least one auxiliary power receiving coil which is formed by winding a winding wire and in which inductive power is generated by the magnetic fluxes of the power transmission coil, and the auxiliary power receiving coil includes:

a first annular auxiliary coil that includes a first extended auxiliary portion that extends in a direction intersecting with the first extended power receiving portion; and a second annular auxiliary coil which includes a second extended auxiliary portion that extends along the first extended auxiliary portion, and in which a magnetic flux acting in a direction differing from the direction of a magnetic flux of the first annular auxiliary coil is generated.

6. The power supply device according to claim 5, wherein the first extended auxiliary portion extends in a direction that is orthogonal to the first extended power receiving portion, and the second extended auxiliary portion extends in a direction that is orthogonal to the second extended power receiving portion.

7. The power supply device according to claim 5, wherein the power receiver includes a plurality of auxiliary power receiving coils, and in each of the auxiliary power receiving coils, the first extended auxiliary portion in the first annular auxiliary coil is positioned so as to be displaced in the direction in which the seat rotates from the first extended power receiving portion and the first extended auxiliary portions of the other first annular auxiliary coils.

8. A power supply device comprising:

a power transmitter configured to supply power to a seat that can slide and rotate relative to a floor part of a vehicle, the power transmitter being provided on the floor part and extending along a slide direction in which the seat slides; and a power receiver that is provided to the seat and that receives power from the power transmitter in a contactless fashion, wherein the power transmitter is provided so that the length dimension thereof in the slide direction is longer than the length dimension thereof in a direction that is orthogonal to the slide direction, and a part of the power receiver that receives power from the power transmitter is positioned close to the power transmitter within an installation area of the power transmitter while the seat slides and rotates, wherein the power transmitter includes a power transmission coil that is formed by winding a winding wire, the power receiver includes a power receiving coil which is formed by winding a winding wire and in which inductive power is generated by magnetic fluxes of the power transmission coil, the power transmission coil includes:

a first annular power transmission coil including a first extended power transmission portion that extends in the slide direction, and a second annular power transmission coil including a second extended power transmission portion that extends in the slide direction along the first extended power transmission portion, and in which the direction of a current in the second extended power transmission portion is the same as the direction of a current in the first extended power transmission portion, and the power receiving coil includes:

a first annular power receiving coil that includes a first extended power receiving portion that extends in the slide direction along the first extended power transmission portion when the seat is facing the direction in which the vehicle advances; and a second annular power receiving coil which includes a second extended power receiving portion that extends in the slide direction along the first extended power receiving portion and the second extended power transmission portion when the seat is facing the direction in which the vehicle advances, and in which the direction of a current in the second extended power receiving portion is the same as the direction of a current in the first extended power receiving portion.

\* \* \* \* \*